(12) United States Patent
Wool

(10) Patent No.: US 6,373,948 B1
(45) Date of Patent: *Apr. 16, 2002

(54) CRYPTOGRAPHIC METHOD AND APPARATUS FOR RESTRICTING ACCESS TO TRANSMITTED PROGRAMMING CONTENT USING PROGRAM IDENTIFIERS

(75) Inventor: Avishai Wool, Livingston Township, Essex County, NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/912,186

(22) Filed: Aug. 15, 1997

(51) Int. Cl.⁷ .............................................. H04N 7/167
(52) U.S. Cl. ....................................... 380/241; 380/239
(58) Field of Search ........................... 380/20, 239, 241

(56) References Cited

U.S. PATENT DOCUMENTS

| 4,388,643 A | * | 6/1983 | Aminetzah | 358/123 |
| 4,887,296 A | | 12/1989 | Horne | 380/21 |
| 4,932,056 A | * | 6/1990 | Shamir | 380/23 |

(List continued on next page.)

FOREIGN PATENT DOCUMENTS

| EP | 0 343 805 | 11/1989 |
| EP | 0 450 841 | 10/1991 |
| EP | 0 660 563 | 6/1995 |
| WO | WO 95/23468 | 8/1995 |
| WO | WO 97/23074 | 6/1997 |

OTHER PUBLICATIONS

Guillou et al. "Encipherment and Conditional Access" SMPTE Journal, US, SMPTE Inc. Scarsdale, NY, vol. 103, No. 6, pp. 398–406, 1994.

J. McCormac, European Scrambling Systems, Circuits Tactics and Techniques ("The Black Book"), Waterford University Press, pp. 2–79, 4–10 and 4–11 (1996).

Primary Examiner—Gilberto Barron, Jr.
Assistant Examiner—Douglas Meislahn
(74) Attorney, Agent, or Firm—Ryan Mason & Lewis LLP

(57) ABSTRACT

A system for restricting access to transmitted programming content is disclosed, which transmits a program identifier with the encrypted programming content. A set-top terminal or similar mechanism restricts access to the transmitted multimedia information using stored decryption keys. The set-top terminal preferably receives entitlement information periodically from the head-end, corresponding to one or more packages of programs that the customer is entitled to for a given period. Each program is preferably encrypted by the head-end server prior to transmission, using a program key, $K_p$, which may be unique to the program. The set-top terminal uses the received program identifier, p, together with the stored entitlement information, to derive the decryption key necessary to decrypt the program. Each of the k-bit program keys, $K_p$, used to encrypt transmitted programs is a linear combination of a defined set of k-bit master keys, $m_1 \ldots m_1$. The head-end server preferably generates a new set of master keys for the matrix, M, once per billing period. Since each program key, $K_p$, is a linear combination of the set of master keys, M, a customer desiring r programs, obtains access to the smallest linear subspace of programs, U, that contains those r programs. In addition, a package consists of $(2^i-1)$ program identifiers for some i less than or equal to n, which need not all be assigned to programs. An optional check matrix, C, allows the set-top terminal to determine, in advance, whether a received program is in the entitled subspace, U.

52 Claims, 10 Drawing Sheets

U.S. PATENT DOCUMENTS

| | | | | |
|---|---|---|---|---|
| 4,995,082 A | * | 2/1991 | Schnorr | 380/23 |
| 5,263,159 A | * | 11/1993 | Mitsui | 395/60 |
| 5,295,188 A | | 3/1994 | Wilson et al. | 380/30 |
| 5,481,609 A | * | 1/1996 | Cohen et al. | 380/16 |
| 5,502,767 A | * | 3/1996 | Sasuta et al. | 380/20 |
| 5,608,801 A | * | 3/1997 | Aiello et al. | 380/46 |
| 5,615,265 A | * | 3/1997 | Coutrot | 380/20 |
| 5,761,669 A | * | 6/1998 | Montague et al. | 707/103 |

* cited by examiner

TOPIC HIERARCHY

[2 BITS]  600

0:     BONUS ...

1:     MOVIES ...

2:     SPORTS [5 BITS]

2.0:     BASEBALL ...

2.1:     FOOTBALL ...

2.2:     BASKETBALL [2 BITS]

2.2.0:     COLLEGE 2.2.1:     PROFESSIONAL 2.2.2:     EUROPEAN 2.2.3:

...

2.3.1: ...

3:     OTHER

| ENTITLEMENT DATABASE |
| --- |
| CUSTOMER KEY MATRIX, $K$ |
| INVERSE MATRIX, $(B')^{-1}$ |
| ACTIVE ROW INDICES |
| CHECK MATRIX, $C$ |

FIG. 7

BASIS VECTORS, $B\mu$, FOR "PROFESSIONAL BASKETBALL" TOPIC

|  | BASIS VECTOR |
| --- | --- |
| $z$ | 100001001 \|\| 00 ... 0 |
| $e_{l+1}$ | 00000000 \|\| 10 ... 0 |
| $e_{l+2}$ | 00000000 \|\| 01 ... 0 |
| ... | ... |
| $e_n$ | 00000000 \|\| 00 ... 1 |

FIG. 8b

CRYPTOGRAPHIC METHOD AND APPARATUS FOR RESTRICTING ACCESS TO TRANSMITTED PROGRAMMING CONTENT USING PROGRAM IDENTIFIERS

FIELD OF THE INVENTION

The present invention relates generally to a system for restricting access to transmitted programming content, and more particularly, to a system for transmitting an encrypted program together with a program identifier which is used by a set-top terminal, together with stored entitlement information, to derive the decryption key necessary to decrypt the program.

BACKGROUND OF THE INVENTION

As the number of channels available to television viewers has increased, along with the diversity of the programming content available on such channels, it has become increasingly challenging for service providers, such as cable television operators and digital satellite service operators, to offer packages of channels and programs that satisfy the majority of the television viewing population. The development of packages that may be offered to customers is generally a marketing function. Generally, a service provider desires to offer packages of various sizes, from a single program to all the programs, and various combinations in between.

The service provider typically broadcasts the television programs from a transmitter, often referred to as the "head-end," to a large population of customers. Each customer is typically entitled only to a subset of the received programming, associated with purchased packages. In a wireless broadcast environment, for example, the transmitted programming can be received by anyone with an appropriate receiver, such as an antenna or a satellite dish. Thus, in order to restrict access to a transmitted program to authorized customers who have purchased the required package, the service provider typically encrypts the transmitted programs and provides the customer with a set-top terminal (STT) containing one or more decryption keys which may be utilized to decrypt programs that a customer is entitled to. In this manner, the set-top terminal receives encrypted transmissions and decrypts the programs that the customer is entitled to, but nothing else.

In order to minimize piracy of the highly sensitive information stored in the set-top terminals, including the stored decryption keys, the set-top terminals typically contain a secure processor and secure memory, typically having a capacity on the order of a few kilobits, to store the decryption keys. The secure memory is generally non-volatile, and tamper-resistant. In addition, the secure memory is preferably writable, so that the keys may be reprogrammed as desired, for example, for each billing period. The limited secure memory capacity of conventional set-top terminals limits the number of keys that may be stored and thereby limits the number of packages which may be offered by a service provider. It is noted that the number of programs typically broadcast by a service provider during a monthly billing period can be on the order of 200,000.

In one variation, conventional set-top terminals contain a bit vector having a bit entry corresponding to each package of programs offered by the service provider. Typically, each package corresponds to one television channel. If a particular customer is entitled to a package, the corresponding bit entry in the bit vector stored in the set-top terminal is set to one ("1"). Thereafter, all programs transmitted by the service provider are encrypted with a single key. Upon receipt of a given program, the set-top terminal accesses the bit vector to determine if the corresponding bit entry has been set. If the bit entry has been set, the set-top terminal utilizes a single stored decryption key to decrypt the program.

While, in theory, flexibility is achieved in the bit vector scheme by providing a bit entry for each program, the length of the bit vector would be impractical in a system transmitting many programs in a single billing period. In addition, access control in such a system is provided exclusively by the entries in the bit vector and is not cryptographic. Thus, if a customer is able to overwrite the bit vector, and set all bits to one ("1"), then the customer obtains access to all programs.

In a further variation, programs are divided into packages, and all programs in a given package are encrypted using the same key. Again, each package typically corresponds to one television channel. The set-top terminal stores a decryption key for each package the customer is entitled to. Thus, if a program is to be included in a plurality of packages, then the program must be retransmitted for each associated package, with each transmission encrypted with the encryption key corresponding to the particular package. Although the access control is cryptographic, the overhead associated with retransmitting a given program a number of times discourages service providers from placing the same program in a number of packages and thereby limits flexibility in designing packages of programs.

While such previous systems for encrypting and transmitting programming content have been relatively successful in restricting access to authorized customers, they do not permit a service provider, such as a television network, to offer many different packages containing various numbers of programs to customers, without exceeding the limited secure memory capacity of the set-top terminal or significantly increasing the overhead. As apparent from the above-described deficiencies with conventional systems for transmitting encrypted programming content, a need exists for a system for transmitting a program encrypted with a key, together with a program identifier used by a set-top terminal, together with stored entitlement information, to derive the decryption key necessary to decrypt the program. A further need exists for a system that permits a service provider to include a program in a plurality of packages, without requiring the service provider to retransmit the program for each package. Yet another need exists for an access control system that overcomes the secure memory limitations of the set-top terminal without significantly increasing the overhead associated with the transmitted programming content.

SUMMARY OF THE INVENTION

Generally, encrypted programming content is transmitted by a service provider using a transmitter, or head-end server, to one or more customers. According to one aspect of the invention, a program identifier, p, used to identify the program is transmitted to the customer with the programming content. Each customer preferably has a set-top terminal or another mechanism to restrict access to the transmitted multimedia information using decryption keys. The set-top terminal preferably receives entitlement information periodically from the head-end, corresponding to one or more packages of programs that the customer is entitled to for a given period.

Each program is preferably encrypted by the head-end server prior to transmission, using a program key, $K_p$, which may be unique to the program. In addition to transmitting the encrypted program, the head-end server preferably transmits the program identifier, p, to the set-top terminal. The set-top terminal uses the received program identifier, p, together with the stored entitlement information, to derive the decryption key necessary to decrypt the program. In this manner, if a customer is entitled to a particular program, the set-top terminal will be able to derive the encrypted program key, $K_p$, using the stored and received information, and thereafter use the program key, $K_p$, to decrypt the encrypted program. In various embodiments, the program identifier, p, can be interleaved with the program portion or transmitted on a separate dedicated control channel.

According to another aspect of the invention, each of the k-bit program keys, $K_p$, used to encrypt transmitted programs is a linear combination of a defined set of k-bit master keys, $m_1 \ldots m_n$, with each master key, $m_i$, preferably stored by the head-end server in a column of a k x n matrix, M The bit-length, k, of the program keys, $K_p$, must be greater than the bit-length, n, of the program identifier, p. The program identifier, p, serves as a program key-mask by dictating which keys in the master key matrix, M, are utilized in generating the program keys, $K_p$. The head-end server preferably generates a new set of master keys for the matrix, M, once per billing period. In one embodiment, the master key matrix, M, may be randomly generated, provided that the master keys, $m_i$, are linearly independent so that a generated program key, $K_p$, cannot unexpectedly be zero.

A customer purchases one or more desired packages, which together contain r programs. Since each program key, $K_p$, used to encrypt the programs is a linear combination of the set of master keys, M, once the customer obtains the program key, $K_p$, to each of the entitled r programs, then the customer may also easily derive the program keys, $K_p$, to $2^r$ programs. Thus, according to a further aspect of the invention, a customer desiring r programs, actually obtains access to the smallest linear subspace of programs, U, that contains those r programs. The programs are preferably organized in a manner that allows programs with related content to fit into a low dimensional linear subspace. In addition, since each program key, $K_p$, is a linear combination of the master keys, M, a given package cannot have an arbitrary number of programs. Specifically, a package consists of ($2^i-1$) program identifiers, for some value of i which is less than or equal to n, which need not all be assigned to programs.

The set-top terminal needs to decrypt any program, p, that belongs to the customer's entitled subspace, U, but no other programs. The subspace, U, can be represented by a basis matrix, B. In order to decrypt the subspace, U, of programs, each identified by a program identifier, p, the set-top terminal needs a corresponding subset of the master keys, derived from the master key matrix, M. Thus, the set-top terminal includes a customer key matrix, K, containing the derived portion of the master keys to which the customer is entitled. In addition, the entitlement information stored by the set-top terminal includes a set of active row indices, $i_1 \ldots i_r$, used by the head-end server to create a regular matrix, B', from the basis matrix, B, and an inverse of the regular basis matrix, $(B')^{-1}$.

In one preferred embodiment, the set-top terminal also stores a check matrix, C, as part of the entitlement information to allow the set-top terminal to determine, in advance, whether a received program is in the entitled subspace, U, without going through the entire decryption procedure. In this manner, the set-top terminal can definitively distinguish between programs that fail to be decrypted due to transmission errors and those that fail to be decrypted because they are not a member of the subspace, U.

A more complete understanding of the present invention, as well as further features and advantages of the present invention, will be obtained by reference to the following detailed description and drawings.

BRIEF DESCRIPTION OF THE DRAWINGS

FIG. 6 illustrates a representative topic hierarchy utilized by the head-end server of FIG. 2 to organize programs in a manner that allows programs with related content to fit into a low dimensional linear subspace;

FIG. 7 illustrates a sample table from the entitlement database of FIG. 3;

FIG. 8b illustrates the set of basis vectors, $B_\mu$, computed by the entitlement information distribution process of FIG. 8a for a topic of FIG. 6 having an m-bit prefix mask;

DETAILED DESCRIPTION

Figure 1:
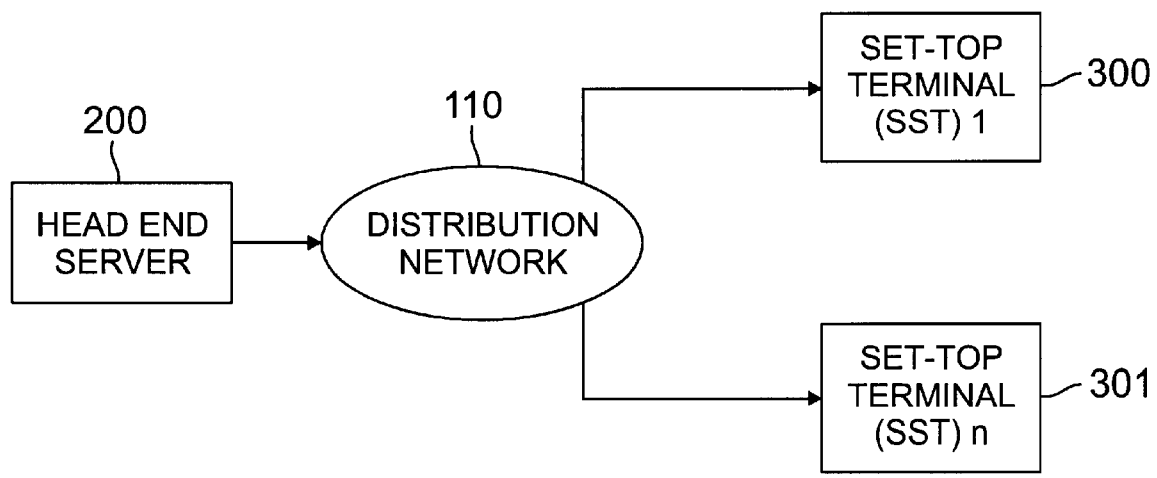
FIG. 1 is a schematic block diagram illustrating a system for transmitting encrypted programming content in accordance with one embodiment of the present invention.

FIG. 1 shows an illustrative network environment for transferring encrypted multimedia information, such as video, audio and data, from a service provider using a transmitter, such as a head-end server 200, discussed further below in conjunction with FIG. 2, to one or more customers having set-top terminals 300–301, such as the set-top terminal 300, discussed further below in conjunction with FIG. 3, over one or more distribution networks 110. As used herein, a set-top terminal includes any mechanism to restrict access to the transmitted multimedia information using decryption keys, including, for example, a computer configuration or a telecommunications device. It is possible for software executed by the set-top terminal to be downloaded by the service provider. The distribution network 110 can be a wireless broadcast network for distribution of programming content, such as a digital satellite service ("DSS™"), or a conventional wired network, such as the cable television network ("CATV"), the Public Switched Telephone Network ("PSTN"), an optical network, a broadband integrated services digital network ("ISDN") or the Internet.

According to a feature of the present invention, the set-top terminal 300 intermittently receives entitlement information from the head-end server 200, which permits a customer to access programs that the customer is entitled to for a given time interval, such as a billing period. As used herein, a package is a predefined set of programs, and a given program can belong to one or more packages. A program is any continuous multimedia transmission of a particular length, such as a television episode or a movie. The entitlement information can be downloaded from the head-end server 200 to the set-top terminal 300 using any suitably secure uni-directional or bi-directional protocol, as would be apparent to a person of ordinary skill.

PROGRAM KEYS AND PROGRAM IDENTIFIERS

As discussed further below, each transmitted program is encrypted by the head-end server 200 using a program key, $K_p$, which may be unique to the program. For a detailed discussion of suitable encryption and security techniques, see B. Schneier, Applied Cryptography (2d ed. 1997), incorporated by reference herein. In addition to transmitting the encrypted program, the head-end server 200 also transmits an n-bit program identifier, p, to the set-top terminals 300, which may be utilized by the set-top terminal 300, together with stored entitlement information, to derive the decryption key necessary to decrypt the program, in a manner described further below. As discussed below in a section entitled ASSIGNING PROGRAM IDENTIFIERS TO PROGRAMS, the program identifiers, p, are not chosen arbitrarily. In one preferred embodiment, the program identifier, p, consists of a thirty-two (32) bit value that may be transmitted, for example, in the ECM field defined in the MPEG-2 standard. In this manner, if a customer is entitled to a particular program, the set-top terminal 300 will be able to derive the program key, $K_p$, from stored and received information, and thereafter use the program key, $K_p$, to decrypt the encrypted program.

According to a further feature of the present invention, each of the k-bit program keys, $K_p$, used to encrypt transmitted programs is a linear combination of a defined set of k-bit master keys, $m_1 \ldots m_n$, with each master key, $m_i$, preferably stored by the head-end server 200 in a column of a k x n matrix, M. It is noted that the bit-length, k, of the program keys, $K_p$, must be greater than the bit-length, n, of the program identifier, p. In one preferred embodiment, the program keys, $K_p$, have a bit-length of sixty-four (64) bits or one hundred twenty eight (128) bits. Thus, the program key, $K_p$, is a linear combination of the set of master keys, M, such that: In this manner, the program identifier, p, serves as a program key-mask by dictating which keys in the master key matrix, M, are utilized in generating the program keys, $K_p$. If a bit-entry i in a particular program identifier, p, is set to one ("1"), the corresponding master key, $m_i$, from the master key matrix, M, will be used in generating the program key, $K_p$ for the corresponding program.

The head-end server 200 preferably generates a new set of master keys for the matrix, M, once per billing period. The master key matrix, M, may be randomly generated, provided that the master keys, $m_i$, are linearly independent so that a generated program key, $K_p$, cannot unexpectedly be zero. In other words, no master key, $m_i$, can have a value of zero or be a linear combination of the other master keys, $m_i$. It is noted that many conventional encryption algorithms produce a ciphertext which is unencrypted and identical to the plaintext when the program key, $K_p$, is zero. Thus, if the master keys, $m_i$, are linearly independent, the generated program key, $K_p$, will not accidentally be zero and a program will be transmitted in a plaintext format only if the program identifier, p, assigned to the program is intentionally set to zero, for example, for a directory listing or a television network broadcast. It is noted that since k is greater than n, it is always possible to obtain n linearly independent k-bit master keys, $m_i$.

It is further noted, however, that for certain applications, it may not be desirable to require that the master keys, $m_i$, are linearly independent because hackers may use this knowledge to reduce the possible number of trial decryptions that need to be tested in an attempt to decode a program, p, without proper entitlements. In such case, it may be preferable to tolerate a small probability of inadvertently transmitting a program in a plaintext format.

A customer purchases one or more desired packages, which together contain r programs. Since each program key, $K_p$, used to encrypt the programs is a linear combination of the set of master keys, M, once the customer obtains the program key, $K_p$, to each of the entitled r programs, then the customer may also easily derive the program keys, $K_p$, to $2^r$ programs. Thus, the system may be said to "leak" information, because having the program keys to r programs gives the customer the ability to derive the program keys of $2^r$ programs (including programs having a program identifier, p, of zero, corresponding to plaintext programs). In other words, when the customer purchases r programs, the customer actually obtains the smallest subspace of programs, U, that contains those r programs. Thus, according to a further feature of the invention, the only type of packages that a customer may obtain is in the form of a linear subspace of program identifiers. In addition, since the program keys, $K_p$, are a linear combination of the master keys, M, a given package cannot have an arbitrary number of programs. Specifically, a package must consist of $(2^i-1)$ programs, for some i less than or equal to n. Of course, not all $(2^i-1)$ of the program identifiers, p, associated with a package need to be assigned.

SET-TOP TERMINAL ENTITLEMENT INFORMATION

Thus, the customer's set-top terminal 300 needs to decrypt any program, p, that belongs to the subspace, U, but no other programs. As previously indicated, when a customer purchases a package of programs, the customer obtains an r-dimensional subspace of programs, U. The subspace, U, can be represented by an n x r basis matrix, B, whose columns, $b_1 \ldots b_r$, span the subspace, U, where U is the set of all linear combinations of B's columns and B is of dimension r. In order to decrypt the subspace, U, of programs, each identified by a program identifier, p, the set-top terminal 300 needs a corresponding subset of the master keys, derived from the master key matrix, M Thus, the set-top terminal 300 is provided a customer key matrix, K, containing the derived portion of the master keys to which the customer is entitled. The customer key matrix, K, may be obtained by multiplying the master key matrix, M, by the basis matrix, B, which represents the customer's subspace, U, of programs as follows:

$$K=MB \qquad [2]$$

The customer key matrix, K, will be generated by the head-end server 200, in a manner described below in conjunction with FIG. 8, and downloaded to the set-top terminal 300 for storage, for example, once per billing period.

As previously indicated, the head-end server 200 will transmit the program identifier, p, with the encrypted program. Thus, given the program identifier, p, the set-top terminal 300 must obtain the program key, $K_p$, used to decrypt the received program. As previously indicated, the program key, $K_p$, is a linear combination of the master keys, M, according to equation 1. The set-top terminal 300, of course, does not have access to the master key matrix, M.

Thus, the program keys, $K_p$, must be obtained indirectly using the customer key matrix, K, and the received program identifier, p.

In order to solve equations 1 and 2, for the program keys, $K_p$, the relationship between the program identifier, p, and the basis matrix, B, must be identified. Since B is a basis for U, and the program identifier, p, is a member of U, the program identifier, p, can be written as a linear combination of the basis vectors. In other words, there exists an r-dimensional vector x, such that:

$$p = Bx \quad [3]$$

As discussed below, equation 3 can be solved for the r-dimensional vector x. Thus, by substituting equation 3 into equation 1, the program key, $K_p$, can be represented as follows:

$$K_p = MBx \quad [4]$$

Similarly, by substituting equation 2 into equation 4, the program key, $K_p$, can be represented as follows:

$$K_p = Kx \quad [5]$$

Thus, the set-top terminal 300 can calculate the program key, $K_p$, given the stored customer key matrix, K, and deriving the r-dimensional vector x from stored and received information, in a manner described below.

Figure 4A:
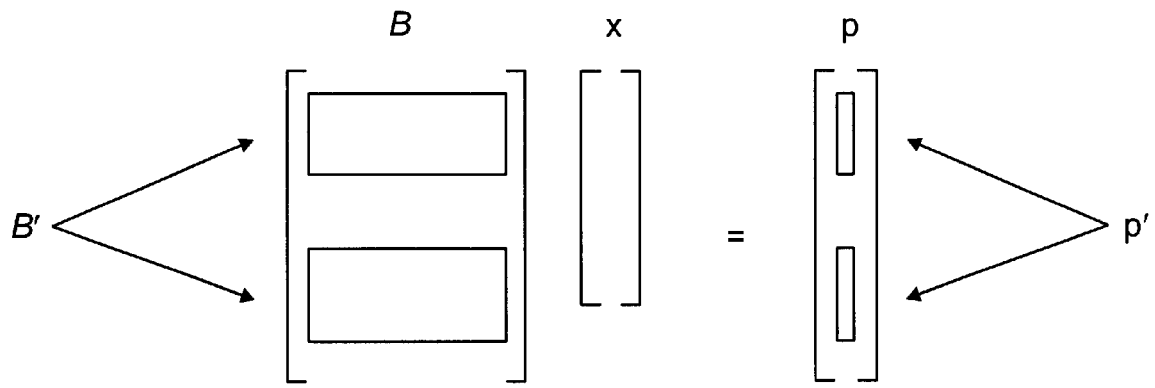
FIGS. 4a and 4b illustrate a linear equation system utilized to obtain entitlement information stored by the set-top terminal of FIG. 3.

As previously indicated, equation 3 can be solved for the r-dimensional vector x. FIG. 4a illustrates the linear equation system corresponding to equation 3. Thus, given the stored basis matrix, B, and the received program identifier, p, equation 3 must be solved for the r-dimensional vector x. It is noted that whenever the subspace, U, is less than the space of all programs, the dimension r will be less than n, and equation 3 is over-defined with n equations and r variables. However, since the program identifier, p, is a member of the subspace, U, a solution to equation 3 must exist.

If the basis matrix, B, is limited to the rows, $i_1 \ldots i_r$, of the basis matrix, B, which form a regular r x r submatrix, B', and the program identifier, p, is limited to the corresponding entries of p which form an r-dimensional vector, p', as shown in the shaded portions of FIG. 4a, then equation 3 corresponding to the smaller system can be written as follows:

$$p' = B'x \quad [6]$$

Thus, solving for x, equation 6 can be written as follows:

$$x = (B')^{-1} p' \quad [7]$$

where $(B')^{-1}$ is the r x r inverse of the submatrix, B'. It is noted that the inverse matrix, $(B')^{-1}$, can preferably be downloaded by the head-end server 200 to the set-top terminal 300 once per billing period. In addition, the active row indices, $i_1 \ldots i_r$, required to generate the inverse matrix, $(B')^{-1}$, from the basis matrix, B, are also required by the set-top terminal 300 to generate the r-dimensional vector, p', from the received program identifier, p. Thus, the active row indices, $i_1 \ldots i_r$, are preferably downloaded by the head-end server 200 to the set-top terminal 300 with the other entitlement information.

Thus, the set-top terminal 300 can calculate the r-dimensional vector, x, from the stored inverse matrix, $(B')^{-1}$, and by deriving the r-dimensional vector, p', from the received program identifier, p, by looking at the entries indicated by the stored active row indices, $i_1 \ldots i_r$.

Thereafter, the set-top terminal 300 can calculate the program key, $K_p$, in accordance with equation 5, using the stored customer key matrix, K, and the calculated r-dimensional vector, x.

In one preferred embodiment, discussed below in a section entitled OPTIONAL CHECK MATRIX, the set-top terminal 300 also receives a check matrix, C, as part of the entitlement information to allow the set-top terminal 300 to determine, in advance, whether a received program is in the entitled subspace, U, without going through the entire decryption procedure. In addition, the check matrix, C, permits the set-top terminal 300 to definitively distinguish between programs that fail to be decrypted due to transmission errors and those that fail to be decrypted because they are not a member of the subspace, U. In addition, if the set-top terminal 300 determines that a received program is not a member of the subspace, U, then the set-top terminal 300 can display a message that the customer is not entitled to view the current program.

SYSTEM COMPONENTS

Figure 2:
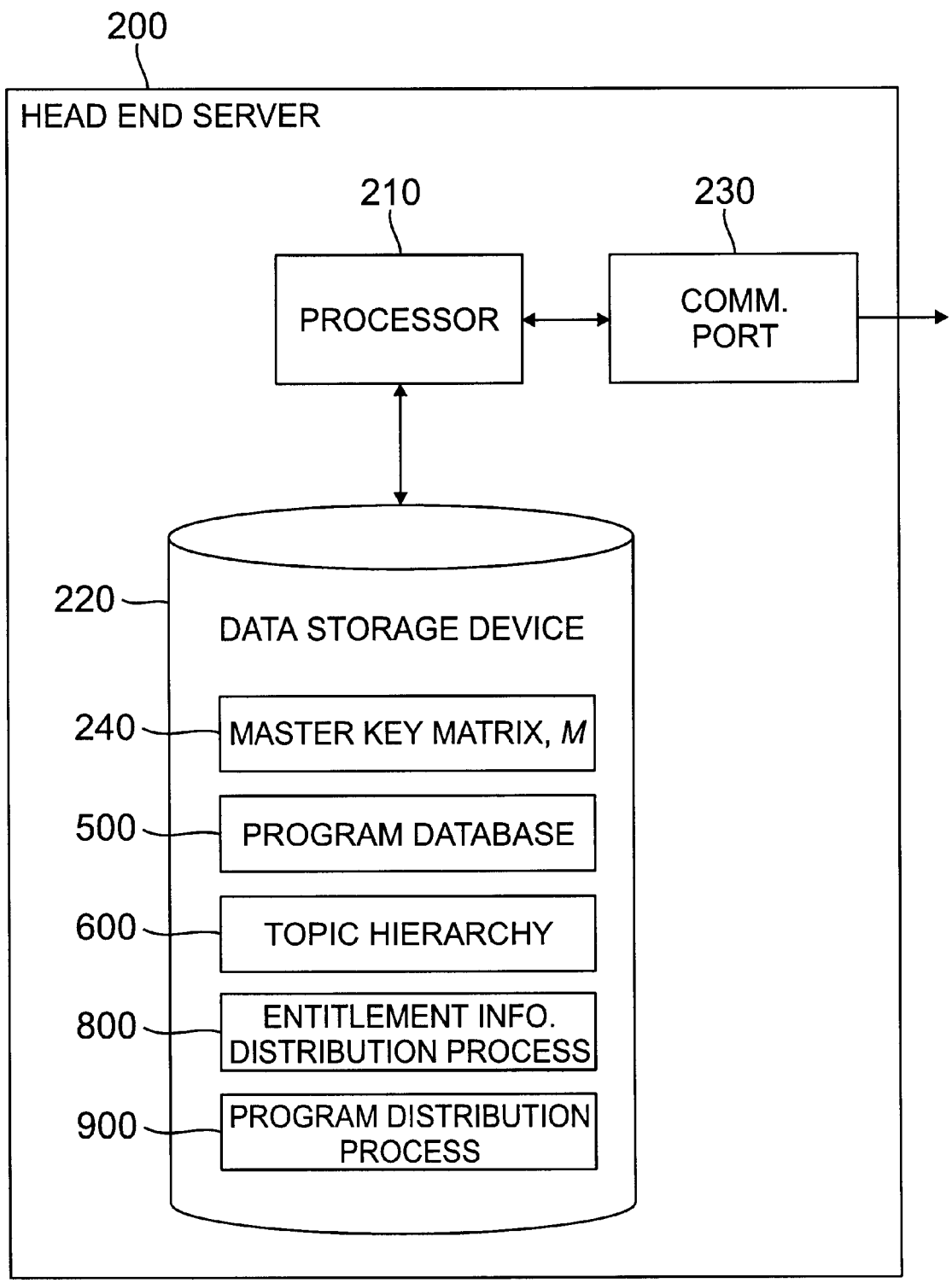
FIG. 2 is a schematic block diagram of an exemplary head-end server of FIG. 1.

FIG. 2 is a block diagram showing the architecture of an illustrative head-end server 200. The head end may be associated with a television network, a cable operator, a digital satellite service operator, or any service provider transmitting encrypted programming content. The head-end server 200 may be embodied, for example, as an RS 6000 server, manufactured by IBM Corp., as modified herein to execute the functions and operations of the present invention. The head-end server 200 preferably includes a processor 210 and related memory, such as a data storage device 220. The processor 210 may be embodied as a single processor, or a number of processors operating in parallel. The data storage device 220 and/or a read only memory (ROM) are operable to store one or more instructions, which the processor 210 is operable to retrieve, interpret and execute. The processor 210 preferably includes a control unit, an arithmetic logic unit (ALU), and a local memory storage device, such as, for example, an instruction cache or a plurality of registers, in a known manner. The control unit is operable to retrieve instructions from the data storage device 220 or ROM. The ALU is operable to perform a plurality of operations needed to carry out instructions. The local memory storage device is operable to provide high-speed storage used for storing temporary results and control information.

As discussed above, the data storage device 220 preferably includes the master key matrix, M, 240 which may be updated, for example, once per billing period. In addition, as discussed further below in conjunction with FIGS. 5 and 6, the data storage device 220 preferably includes a program database 500 and a topic hierarchy 600. The program database 500 preferably indicates the program identifier, p, and associated packages corresponding to each program. The representative topic hierarchy 600 shown in FIG. 6 is preferably utilized by the head-end server 200 to organize programs in a manner that allows programs with related content to fit into a low dimensional linear subspace.

In addition, as discussed further below in conjunction with FIGS. 8 and 9, the data storage device 220 preferably includes an entitlement information distribution process 800 and a program distribution process 900. Generally, the entitlement information distribution process 800 generates and distributes the entitlement information required by each customer to access entitled programs. In addition, the program distribution process 900 preferably derives the program key, $K_p$, based on the program identifier, p, assigned to the program and the set of master keys, M, in order to encrypt and transmit the program with the program identifier, p.

The communications port 230 connects the head-end server 200 to the distribution network 110, thereby linking the head-end server 200 to each connected receiver, such as the set-top terminal 300 shown in FIG. 1.

Figure 3:
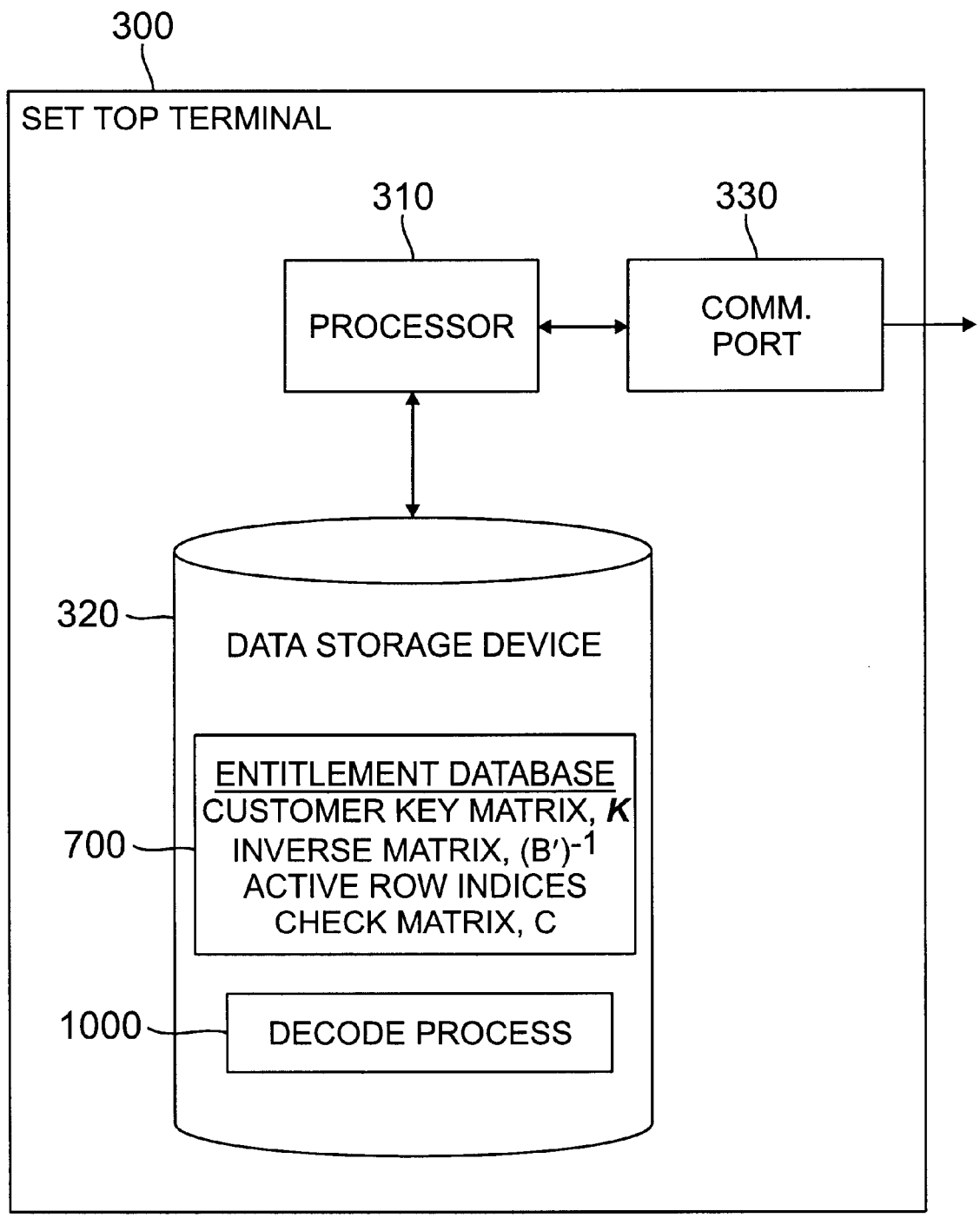
FIG. 3 is a schematic block diagram of an exemplary set-top terminal of FIG. 1.

FIG. 3 is a block diagram showing the architecture of an illustrative set-top terminal 300. The set-top terminal 300 may be embodied, for example, as a set-top terminal (STT) associated with a television, such as those commercially available from General Instruments Corp., as modified herein to execute the functions and operations of the present invention. The set-top terminal 300 preferably includes a processor 310 and related memory, such as a data storage device 320, as well as a communication port 330, which operate in a similar manner to the hardware described above in conjunction with FIG. 2.

As discussed further below in conjunction with FIG. 7, the data storage device 320 preferably includes an entitlement database 700. The entitlement database 700 is preferably stored in a secure portion of the data storage device 320. The entitlement database 700 preferably includes the customer key matrix, K, the inverse matrix, $(B')^{-1}$, the active row indices, $i_1 \ldots i_r$, and, optionally, the check matrix, C. In addition, as discussed further below in conjunction with FIG. 10, the data storage device 320 preferably includes a decode process 1000. Generally, the decode process 1000 decrypts programs that a customer is entitled to, by using the received program identifier, p, and the stored entitlement information 700 to derive the program key, $K_p$, and then using the program key, $K_p$, to decrypt the program.

Figure 5:
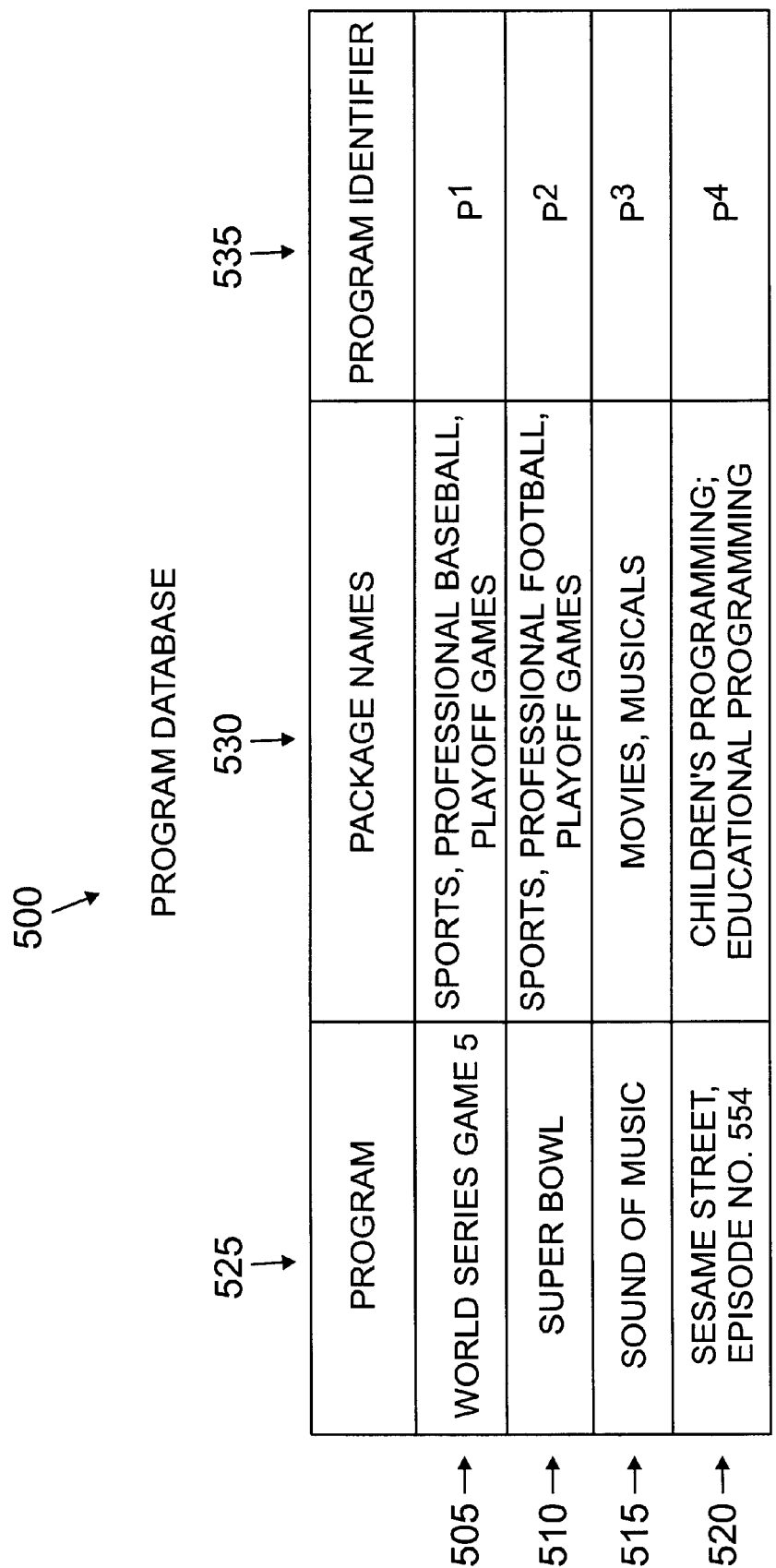
FIG. 5 illustrates a sample table from the program database of FIG. 2.

FIG. 5 illustrates an exemplary program database 500 that preferably stores information on each program, p, which will be transmitted by the head-end server 200, for example, during a given billing period, including the packages the program belongs to and the corresponding program identifier, p. The program database 500 maintains a plurality of records, such as records 505–520, each associated with a different program. For each program identified by program name in field 525, the program database 500 includes an indication of the corresponding packages to which the program belongs in field 530 and the corresponding program identifier, p, in field 535.

FIG. 7 illustrates an exemplary entitlement database 700 that preferably stores the customer key matrix, K, the inverse matrix, $(B')^{-1}$, the active row indices, $i_1 \ldots i_r$, and, optionally, the check matrix, C, as received by the set-top terminal 300 from the head-end server 200.

ASSIGNING PROGRAM IDENTIFIERS TO PROGRAMS

As previously indicated, when a customer purchases a package of programs, in accordance with the present invention, the customer obtains a subspace of programs, U. Thus, to maximize the utility of the present invention, care must be taken to ensure that the program identifiers, p, assigned to programs with related content, fit into low dimensional linear subspaces. Accordingly, the program identifiers, p, are preferably not chosen arbitrarily. For example, if a given customer desires to purchase a package consisting of all sports programs, the customer would likely obtain access to all programs, if the program identifiers, p, were assigned at random. This may be undesirable due to the prohibitive cost of such a package, in addition to potentially providing the customer with unwanted programming, such as adult content.

Generally, programs can be organized in a topic hierarchy 600, shown in FIG. 6, according to attributes such as their subject, age, language, rating or source. The top level in the topic hierarchy 600 consists of very broad topics, which are refined level by level, as appropriate, until the individual programs are reached at the leaves. The hierarchy 600 need not be balanced. In other words, some topics may have many sub-topics while others may have few sub-topics. Thus, programs can be positioned at various depths of the topic hierarchy.

Program identifiers, p, are assigned to programs in the topic hierarchy 600 using the notion of prefix masks. The program identifiers, p, of programs that are located in the same branch are assigned so that they share the same prefix (most significant bits). FIG. 6 illustrates one such representative topic hierarchy 600. Prefix masks are recursively assigned to the nodes in the topic hierarchy 600 by labeling topics from the root towards the leaves. The prefix mask of every topic is its own label concatenated to the mask of its parent. The decimal numbers shown in FIG. 6 represent the mask values. In addition, the mask length for each level of the topic hierarchy appears in square brackets in FIG. 6. For example, the prefix mask for programs under the sub-topic "professional basketball" is "10 00010 01".

It is noted, however, that the collection of professional basketball programs having program identifiers, p, with a prefix mask equal to "10 00010 01" is not a linear subspace. In order to have a linear subspace, a prefix mask equal to "00 00000 00" must be included. Thus, a customer also obtains access to all bonus programs having a program identifier, p, with a prefix mask of "00 00000 00". It is further noted that if a prefix mask is 1 bits long, then the dimension, r, of the subspace is n−1+1. The manner in which the entitlement information 700 is generated by the entitlement information distribution process 800 from the topic hierarchy 600 based on packages of programs selected by a customer is discussed below in conjunction with FIG. 8a.

COMPUTING A BASIS MATRIX FROM SELECTED PREFIX MASKS

Figure 8A:
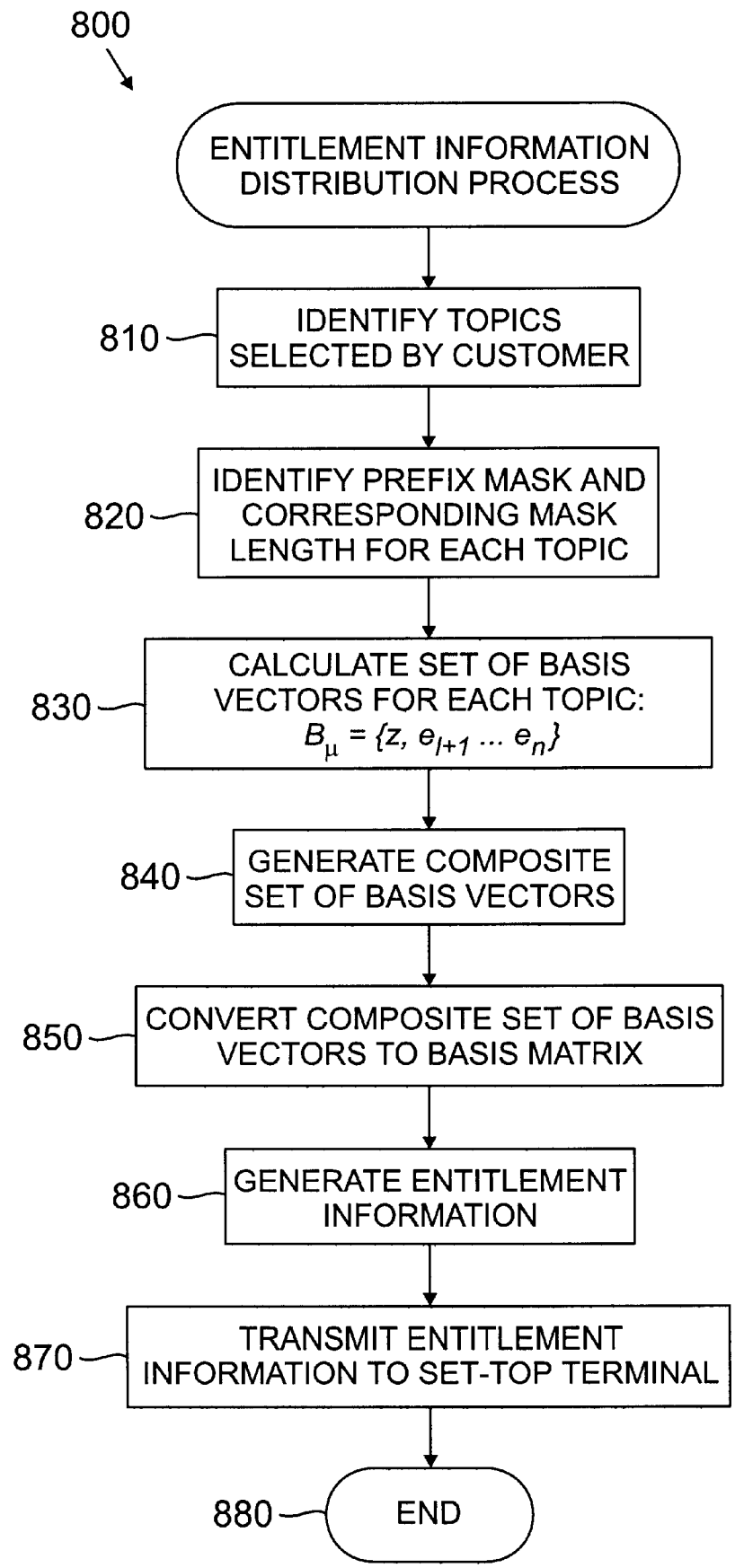
FIG. 8a is a flow chart describing an exemplary entitlement information distribution process as implemented by the head-end server of FIG. 2.

As discussed above, the head-end server 200 preferably executes an entitlement information distribution process 800, shown in FIG. 8a, to generate and distribute the entitlement information 700 required by each customer to access entitled programs. As previously indicated, the entitlement information 700 preferably consists of the customer key matrix, K, the inverse matrix, $(B')^{-1}$, the active row indices, $i_1 \ldots i_r$, and, optionally, the check matrix, C. Each of the components of the entitlement information 700 are derived from the basis matrix, B. Specifically, the customer key matrix, K, is obtained using the master key matrix, M, and the basis matrix, B, in accordance with equation 2; the inverse matrix, $(B')^{-1}$, and the active row indices, $i_1 \ldots i_r$, are obtained from the basis matrix, B, directly, and the check matrix, C, is obtained from the basis matrix, B, in accordance with equation 13, discussed below. Thus, the entitlement information distribution process 800 must first compute the basis matrix, B, based on the packages that a customer selects, which together consist of one or more topics of programs from the topic hierarchy 600.

Thus, initially, during step 810, the entitlement information distribution process 800 identifies the one or more topics of programs containing the programs selected by a customer. If, for example, a customer selects a package consisting of a particular topic in the topic hierarchy 600, then the selected programs share the same prefix mask that has been assigned to the topic. As previously indicated, the collection of programs in a particular topic sharing an 1-bit prefix mask is not a linear subspace. In order to have a linear subspace, a prefix mask equal to "0" and having a length of 1-bits must be included. Thus, a customer also obtains access to all bonus programs having a program identifier, p, with an 1-bit prefix mask of "0". In this manner, a customer is said to obtain access to bonus-extended packages.

Thus, once the selected topic(s) have been identified, the entitlement information distribution process 800 then identifies the prefix mask, $\mu$, for each topic and the length, l, of each prefix mask during step 820. For each non-zero 1-bit mask, $\mu$, the corresponding set of basis vectors, $B_\mu$, is calculated during step 830, in accordance with the following equation:

$$B_\mu = \{z, e_{l+1} \ldots e_n\} \quad [8]$$

where $e_{l+1} \ldots e_n$ denote the standard basis, where $e_i$ has a 1-bit in position i and the enabling vector, z, has the mask, $\mu$, as its prefix, followed by (n–l)0-bits. The set of basis vectors, $B_\mu$, computed during step 830, for the "professional basketball" topic, is shown in FIG. 8b.

A composite set of basis vectors, B, for all of the selected topics is then generated during step 840 by repeatedly including the next vector from the union of all of the individual sets of basis vectors, $B_\mu$, which is independent of all the vectors already in the composite set of basis vector, B, using a set of linear equations. The composite set of basis vector, B, generated in this fashion clearly spans all the programs belonging to the requested topics.

The composite set of basis vectors, B, is then converted to the corresponding (n–l+1) basis matrix, B, during step 850 using each of the vectors, z, $e_{l+1} \ldots e_n$, as its columns. Thereafter, during step 860, the entitlement information distribution process 800 generates the entitlement information 700, including the customer key matrix, K, the inverse matrix, $(B')^{-1}$, the active row indices, $i_1 \ldots i_r$, and, optionally, the check matrix, C, that the customer requires to decrypt entitled programs. Finally, the generated entitlement information is downloaded by the head-end server 200 to the set-top terminal 300 during step 870, before program control terminates during step 880.

It is noted that, generally, the union of linear subspaces is not a linear subspace. Thus, the computed composite set of basis vectors, B, is the basis of a linear subspace that contains all of the requested topics, parts of the bonus hierarchy, as well as other unrequested parts of the topic hierarchy. Thus, the system preferably computes the subspace of programs that would actually be accessible with all of the side-effects.

Figure 9:
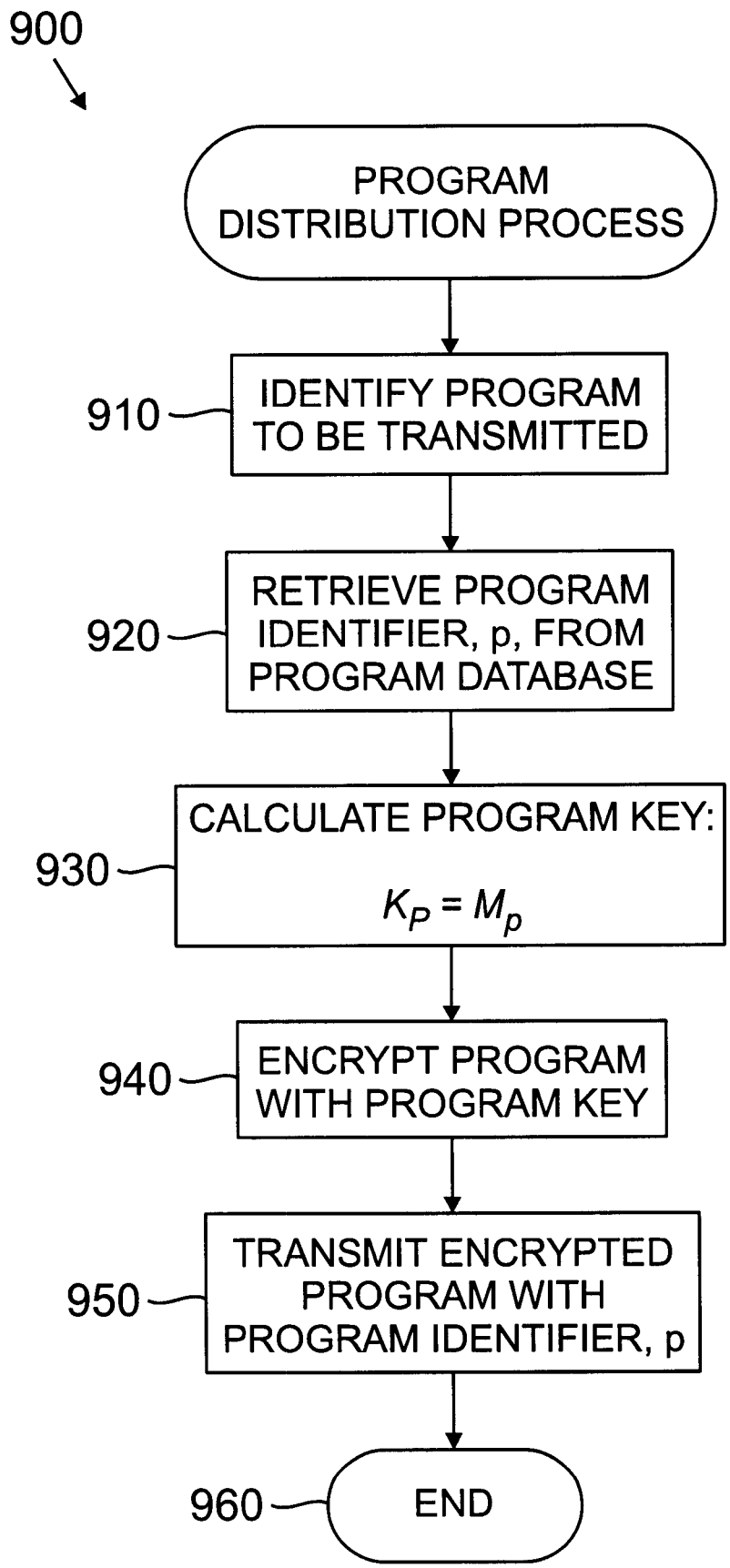
FIG. 9 is a flowchart describing an exemplary program distribution process as implemented by the head end server of FIG. 2.

As discussed above, the head-end server 200 preferably executes a program distribution process 900, shown in FIG. 9, to derive the program key, $K_p$, based on the program identifier, p, assigned to the program and the set of master keys, M, in order to encrypt and transmit the program with the program identifier, p. It is noted that the program distribution process 900, other than the actual transmission step, can be executed offline or in real-time. As illustrated in FIG. 9, the program distribution process 900 begins the processes embodying the principles of the present invention during step 910 by identifying a program to be transmitted.

Thereafter, the program distribution process 900 retrieves the program identifier, p, corresponding to the program from the program database 500, during step 920, and then calculates the program key, $K_p$, corresponding to the program during step 930 in accordance with equation 1. The program will then be encrypted during step 940 with the program key, $K_p$, calculated during the previous step. Finally, the program distribution process 900 will transmit the encrypted program together with the program identifier, p, during step 950, before program control terminates during step 960. It is noted that the program identifier, p, is preferably transmitted periodically interleaved throughout the transmission of the program information, so that a customer can change channels during a program and be able to derive the program key, $K_p$, which is required to decrypt the program. In an alternate embodiment, the program identifier, p, can be continuously transmitted on a separate control channel, such as a Barker channel.

Figure 10:
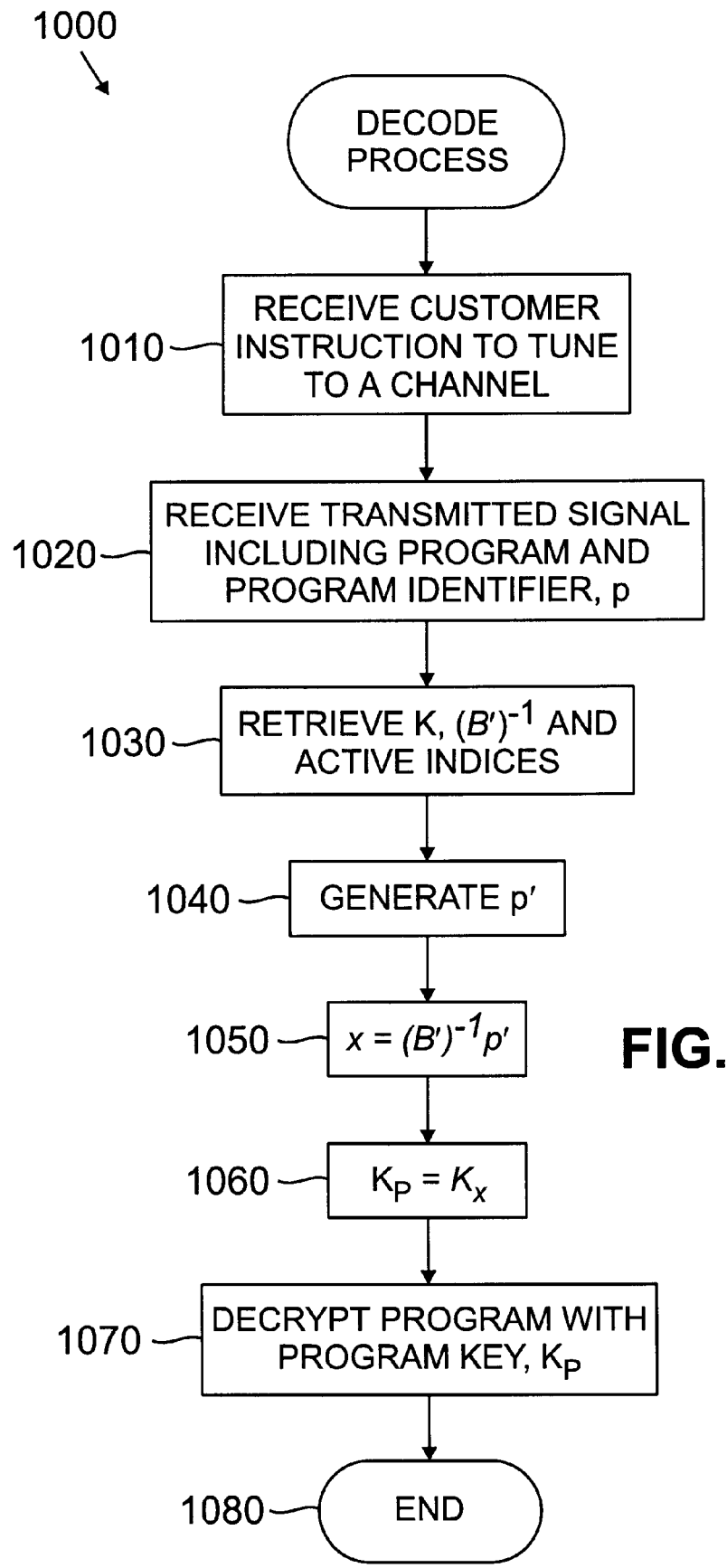
FIG. 10 is a flowchart describing an exemplary decode process as implemented by the set-top terminal of FIG. 3.

As discussed above, the set-top terminal 300 preferably executes a decode process 1000, shown in FIG. 10, to decrypt programs that a customer is entitled to, by using the received program identifier, p, and the stored entitlement information 700 to derive the program key, $K_p$, and then using the program key, $K_p$, to decrypt the program. As illustrated in FIG. 10, the decode process 1000 begins the processes embodying the principles of the present invention during step 1010, upon receipt of a customer instruction to tune to a particular channel.

Thereafter, the set-top terminal 300 will receive the appropriate signal during step 1020, including the encrypted program and the transmitted program identifier, p. The decode process 1000 then retrieves the stored entitlement information from the entitlement database 700 during step 1030. The active indices will be utilized during step 1040 to generate p' from the received program identifier, p. The vector, x, is then calculated during step 1050 in accordance with equation 7 and the program key, $K_p$, is then calculated during step 1060 in accordance with equation 5.

Finally, the program is decrypted using the derived program key, $K_p$, during step 1070, before program control terminates during step 1080. It is noted that if the received program is not part of the entitled subspace, U, then no solution exists for step 1050, and the x vector computed during step 1050 is not a valid solution. Thus, the decode process 1000 generates a program key, $K_p$, which is incorrect for the received program, but actually corresponds to the program key, $K_p$, for another program in the customer's subspace, U, so the decode process 1000 does not generate a program key, $K_p$, that the customer is not entitled to.

It is further noted that the decode process 1000 can wait for the customer to request a particular channel before attempting to derive the decryption keys and determine whether the customer is entitled to the requested channel, as described above, or the decode process 1000 can alternatively periodically scan all channels to obtain the transmitted program identifiers, p, in order to derive the decryption keys for storage in the data storage device 320 and predetermine the customer's entitlement.

ALTERNATIVE ENTITLEMENT INFORMATION

Figure 4B:
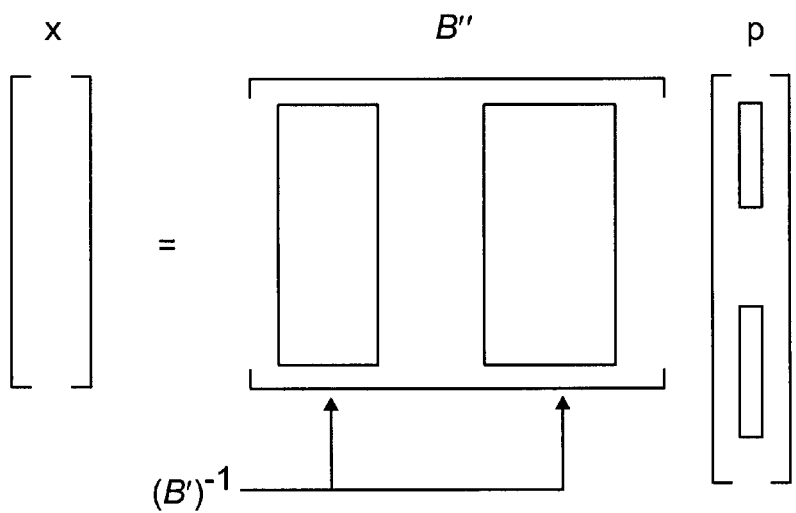

In an alternate implementation, the head-end server 200 can provide the entitlement information to the set-top terminal 300 in the form of a single matrix, D, that incorporates the customer key matrix, K, the inverse matrix, $(B')^{-1}$, and the active row indices, $i_1 \ldots i_r$ by introducing a modified basis matrix, B". The matrix, B", shown in FIG. 4b, is defined to be an r x n matrix whose active index columns, $i_1 \ldots i_r$, contain the columns of the inverse matrix, $(B')^{-1}$, and is zero ("0") in all other positions. The non-zero portions of B" and the corresponding entries in p are shaded in FIG. 4b. In this alternate implementation, the matrix, D, is defined as follows:

$$D = MBB'' \quad [9]$$

In addition, the vector, x, can be expressed as follows:

$$x = B''p \quad [10]$$

The matrix, D, is the only entitlement information required by the decode process 1000 to compute the program key, $K_p$. In order to create the matrix, D, the head-end server 200 must utilize the basis matrix, B, based on the packages selected by the customer, to compute the inverse matrix, $(B')^{-1}$, expand the inverse matrix to form B", and then utilize the master key matrix, M, in accordance with equation 9.

By substituting equation 10 into equation 4, the program key, $K_p$, can be represented as follows:

$$K_p = MBB''p \quad [11]$$

The program key, $K_p$, calculation performed by the decode process 1000 during step 1060 can be further simplified using equation 9 as follows:

$$K_p = Dp \quad [12]$$

OPTIONAL CHECK MATRIX

As previously indicated, the set-top terminal 300 optionally receives a check matrix, C, as part of the entitlement information 700 to allow the set-top terminal 300 to determine, in advance, whether a received program is in the entitled subspace, U, without going through the entire decode process 1000. In addition, the check matrix, C, permits the set-top terminal 300 to definitively distinguish between programs that fail to be decrypted due to transmission errors and those that fail to be decrypted because they are not a member of the subspace, U. In addition, if the set-top terminal 300 determines that a received program is not a member of the subspace, U, then the set-top terminal 300 can display a message or provide other feedback indicating that the customer is not entitled to view the current program. The n×n check matrix, C, is defined as follows:

$$C = BB'' - I \quad [13]$$

where I is the n-dimensional unit matrix.

Thus, a given received program having a program identifier, p, is a member of the customer's subspace, U, if and only if Cp=0. It is noted that if the customer's entitled subspace, U, is the set of all programs, then any basis matrix is an n-dimensional regular matrix in itself and therefore, $B'' = B^{-1}$ and $BB'' = I$. Thus, the check matrix, C, becomes zero and the above test always succeeds.

It is to be understood that the embodiments and variations shown and described herein are merely illustrative of the principles of this invention and that various modifications may be implemented by those skilled in the art without departing from the scope and spirit of the invention.

I claim:

1. A method of transmitting a program having restricted access to an end-user, said method comprising the steps of:
    assigning a program identifier to said program, said program identifier uniquely identifying said program for a duration of said program;
    defining a plurality of master keys;
    providing entitlement information to said end-user derived from said master keys;
    encrypting said program using a program key, said program key being a linear combination of said master keys and said program identifier determining which keys in said plurality of master keys are utilized to generate said program key; and
    transmitting said encrypted program together with said program identifier to said end-user, whereby said end-user can derive said program key from only said program identifier and said entitlement information.

2. The method according to claim 1, wherein said program is a portion of a linear subspace of programs obtained by said end-user.

3. The method according to claim 1, wherein said programs are organized in a manner that allows programs with related content to fit into a low dimensional linear subspace.

4. The method according to claim 1, further comprising the step of providing entitlement information to said end-user derived from said master keys based on the set of programs obtained by said end-user.

5. The method according to claim 4, wherein said entitlement information includes a set of keys derived from said master keys based on the set of programs obtained by said end-user.

6. The method according to claim 4, wherein said entitlement information includes a basis matrix representing a linear subspace of programs obtained by said end-user.

7. The method according to claim 4, wherein said end-user uses said received program identifier to derive said program key from said stored entitlement information.

8. The method according to claim 1, wherein said plurality of master keys are linearly independent.

9. The method according to claim 1, wherein said program key for said program is obtained by multiplying said plurality of master keys by said program identifier.

10. The method according to claim 1, wherein said program identifier is interleaved with the transmission of said encrypted program.

11. The method according to claim 1, wherein said program identifier is transmitted on a control channel.

12. The method according to claim 1, further comprising the step of providing a check matrix to said end-user that permits said end-user to determine whether said end-user is entitled to said program.

13. A method of transmitting a program to a plurality of end-users, said method comprising the steps of:
    providing entitlement information to said end-user derived from a set of master keys;
    encrypting said program using a program key, said program having a program identifier that uniquely identifies said program for a duration of said program, said program key being a linear combination of a plurality of master keys and said program identifier determining which keys in said plurality of master keys are utilized to generate said program key; and
    transmitting said encrypted program together with said program identifier to said end-user, said program being a portion of a linear subspace of programs obtained by said end-user, whereby said end-user can derive said program key from only said program identifier and said entitlement information.

14. The method according to claim 13, wherein said programs are organized in a manner that allows programs with related content to fit into a low dimensional linear subspace.

15. The method according to claim 13, further comprising the step of providing entitlement information to said end-user derived from said master keys based on the set of programs obtained by said end-user.

16. The method according to claim 15, wherein said entitlement information includes a set of keys derived from said master keys based on the set of programs obtained by said end-user.

17. The method according to claim 15, wherein said entitlement information includes a basis matrix representing a linear subspace of programs obtained by said end-user.

18. The method according to claim 15, wherein said end-user uses said received program identifier to derive said program key from said stored entitlement information.

19. The method according to claim 13, wherein said plurality of master keys are linearly independent.

20. The method according to claim 13, wherein said program key for said program is obtained by multiplying said plurality of master keys by said program identifier.

21. The method according to claim 13, further comprising the step of providing a check matrix to said end-user that permits said end-user to determine whether said end-user is entitled to said program.

22. A method of transmitting a program associated with at least one package of programs to a plurality of end-users, said method comprising the steps of:
   providing entitlement information to said end-users based on the set of programs obtained by said end-user;
   encrypting said program using a program key, said program having a program identifier that uniquely identifies said program for a duration of said program, said program key being a linear combination of a plurality of master keys and said program identifier determining which keys in said plurality of master keys are utilized to generate said program key; and
   transmitting said program identifier with said encrypted program to said end-users, whereby said end-users can derive said program key from only said program identifier and said stored entitlement information if said end-user is entitled to said program.

23. The method according to claim 22, wherein said program is a portion of a linear subspace of programs obtained by said end-user.

24. The method according to claim 22, wherein programs are organized in a manner that allows programs with related content to fit into a low dimensional linear subspace.

25. The method according to claim 22, further comprising the step of providing entitlement information to said end-user derived from said master keys based on the set of programs obtained by said end-user.

26. The method according to claim 25, wherein said entitlement information includes a set of keys derived from said master keys based on the set of programs obtained by said end-user.

27. The method according to claim 25, wherein said entitlement information includes a basis matrix representing a linear subspace of programs obtained by said end-user.

28. The method according to claim 25, wherein said end-user uses said received program identifier to derive said program key from said stored entitlement information.

29. The method according to claim 22, wherein said plurality of master keys are linearly independent.

30. The method according to claim 22, wherein said program key for said program is obtained by multiplying said plurality of master keys by said program identifier.

31. The method according to claim 22, further comprising the step of providing a check matrix to said end-user that permits said end-user to determine whether said end-user is entitled to said program.

32. A method for decoding an encrypted program, said method comprising the steps of:
   receiving entitlement information from a provider of said program, said entitlement information based on a set of programs obtained by said customer;
   receiving said encrypted program together with a program identifier that uniquely identifies said program for a duration of said program, said encrypted program encrypted with a program key, said program key being a linear combination of master keys and said program identifier determining which keys in said plurality of master keys are utilized to generate said program key;
   deriving said program key from only said program identifier and said stored entitlement information; and
   decrypting said encrypted program using said program key.

33. The method according to claim 32, wherein said program is a portion of a linear subspace of programs obtained by an end-user.

34. The method according to claim 32, wherein said entitlement information includes a set of keys derived from said master keys based on the set of programs obtained by an end-user.

35. The method according to claim 32, wherein said entitlement information includes a basis matrix representing a linear subspace of programs obtained by an end-user.

36. The method according to claim 32, wherein said plurality of master keys are linearly independent.

37. The method according to claim 32, wherein said program identifier is interleaved with the transmission of said encrypted program.

38. The method according to claim 32, wherein said program identifier is transmitted on a control channel.

39. The method according to claim 32, further comprising the step of receiving a check matrix that permits an end-user to determine whether said end-user is entitled to said program.

40. The method according to claim 32, wherein said program identifier is evaluated upon a request to view said program.

41. The method according to claim 32, wherein said program identifier is evaluated in advance of a request to view said program.

42. A method for receiving an encrypted program having restricted access, said method comprising the steps of:
   receiving entitlement information derived from a set of master keys;
   receiving said program together with a program identifier that uniquely identifies said program for a duration of said program, said program encrypted using a program key, said program key being a linear combination of a plurality of master keys and said program identifier determining which keys in said plurality of master keys are utilized to generate said program key;
   deriving said program key from only said program identifier and said stored entitlement information, said entitlement information being derived from said master keys based on a linear subspace of programs obtained by said customer; and
   decrypting said encrypted program using said program key.

43. The method according to claim 42, wherein said entitlement information includes a set of keys derived from said master keys based on the set of programs obtained by an end-user.

44. The method according to claim 42, wherein said entitlement information includes a basis matrix representing a linear subspace of programs obtained by an end-user.

45. The method according to claim 42, wherein said plurality of master keys are linearly independent.

46. The method according to claim 42, wherein said program identifier is interleaved with the transmission of said encrypted program.

47. The method according to claim 42, wherein said program identifier is transmitted on a control channel.

48. The method according to claim 42, further comprising the step of receiving a check matrix that permits an end-user to determine whether said end-user is entitled to said program.

49. The method according to claim 42, wherein said program identifier is evaluated upon a request to view said program.

50. The method according to claim 42, wherein said program identifier is evaluated in advance of a request to view said program.

51. An article of manufacture for transmitting a program having restricted access to an end-user, comprising:

- a computer readable medium having computer readable program code means embodied thereon, said computer readable program code means comprising:
- a step to assign a program identifier to said program that uniquely identifies said program for a duration of said program;
- a step to define a plurality of master keys;
- a step to provide entitlement information to said end-user derived from said master keys;
- a step to encrypt said program using a program key, said program key being a linear combination of said master keys and said program identifier determining which keys in said plurality of master keys are utilized to generate said program key; and
- a step to transmit said encrypted program together with said program identifier to said end-user, whereby said end-user can derive said program key from only said program identifier and said entitlement information.

52. An article of manufacture for decoding an encrypted program, comprising:

- a computer readable medium having computer readable program code means embodied thereon, said computer readable program code means comprising:
- a step to receive entitlement information from a provider of said program, said entitlement information based on a set of programs obtained by said customer;
- a step to receive said program together with a program identifier that uniquely identifies said program for a duration of said program, said program encrypted using a program key, said program key being a linear combination of a plurality of master keys and said program identifier determining which keys in said plurality of master keys are utilized to generate said program key;
- a step to derive said program key from only said program identifier and stored entitlement information, said entitlement information being derived from said master keys based on a linear subspace of programs obtained by said customer; and
- a step to decrypt said encrypted program using said program key.

\* \* \* \* \*